(12) United States Patent
Sato (10) Patent No.: US 9,663,100 B2
(45) Date of Patent: May 30, 2017

(54) HYBRID VEHICLE

(71) Applicant: Toyota Jidosha Kabushiki Kaisha, Toyota-shi, Aichi-ken (JP)

(72) Inventor: Keita Sato, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/019,022

(22) Filed: Feb. 9, 2016

(65) Prior Publication Data

US 2016/0244045 A1    Aug. 25, 2016

(30) Foreign Application Priority Data

Feb. 25, 2015   (JP) .................. 2015-035266

(51) Int. Cl.
*B60W 10/06* (2006.01)
*B60W 10/08* (2006.01)
*B60W 20/13* (2016.01)

(52) U.S. Cl.
CPC ............ *B60W 20/13* (2016.01); *B60W 10/06* (2013.01); *B60W 10/08* (2013.01); *B60W 2540/10* (2013.01); *B60W 2710/0666* (2013.01); *B60W 2710/083* (2013.01); *B60W 2710/244* (2013.01); *Y02T 10/6239* (2013.01); *Y02T 10/6286* (2013.01); *Y02T 10/7005* (2013.01); *Y02T 10/7077* (2013.01); *Y10S 903/93* (2013.01)

(58) Field of Classification Search
CPC ....... B60W 20/13; B60W 10/06; B60W 10/08
USPC ..................... 701/22; 257/777, 698
See application file for complete search history.

(56) References Cited

U.S. PATENT DOCUMENTS

2009/0288896 A1* 11/2009 Ichikawa ............... B60K 6/365
                                                    180/65.265
2013/0166125 A1* 6/2013 Yamamoto ............... B60L 7/14
                                                    701/22

FOREIGN PATENT DOCUMENTS

| EP | 2815945 A1 | 12/2014 |
|---|---|---|
| JP | 2013-252853 A | 12/2013 |
| JP | 2014-054874 A | 3/2014 |
| WO | 2013/110761 A1 | 8/2013 |
| WO | 2013/121574 A1 | 8/2013 |

* cited by examiner

*Primary Examiner* — Marthe Marc-Coleman
(74) *Attorney, Agent, or Firm* — Dinsmore & Shohl LLP (57) ABSTRACT

An ECU can select one of a Charge Depleting (CD) mode and a Charge Sustaining (CS) mode. The ECU changes responsiveness of a vehicle driving torque to an operation of an accelerator pedal between the CD mode and the CS mode such that the responsiveness is higher when the CD mode is selected than when the CS mode is selected. When the responsiveness is changed in accordance with mode switching, the ECU further performs a gradually-changing process for bringing the responsiveness from a value before mode switching closer to a value after mode switching as time progresses.

14 Claims, 10 Drawing Sheets

HYBRID VEHICLE

CROSS-REFERENCE TO RELATED APPLICATIONS

This nonprovisional application claims the benefit of Japanese Patent Application No. 2015-035266 filed on Feb. 25, 2015 with the Japan Patent Office, the entire contents of which are hereby incorporated by reference.

BACKGROUND

Field

The present disclosure relates to a hybrid vehicle, and particularly to a hybrid vehicle including an internal combustion engine, a power storage device, and an electric motor that receives electric power from the power storage device to generate travel driving force.

Description of the Background Art

Japanese Patent Laying-Open No. 2013-252853 discloses a hybrid vehicle implementing a CD (Charge Depleting) mode and a CS (Charge Sustaining) mode. In the CD mode, EV (Electric Vehicle) traveling is mainly executed while allowing HV (Hybrid Vehicle) traveling, so that an SOC (State Of Charge) of a power storage device is actively consumed. In the CS mode, the SOC is controlled so as to fall within a prescribed range by switching the traveling mode between HV traveling and EV traveling as appropriate. In EV traveling, the vehicle travels using only a motor generator while stopping its engine. In HV traveling, the vehicle travels while operating its engine (see Japanese Patent Laying-Open No. 2013-252853).

Due to recent progress in the power electronics technique, motors, inverters, power storage devices and the like have been improved in performance. Also due to such a technical background, hybrid vehicles have been increased in flexibility in selecting a driving force source (an engine or a motor). Thus, it is desirable for a hybrid vehicle implementing a CD mode and a CS mode to achieve a special traveling performance with a high level of user satisfaction particularly in the CD mode.

In general, the relation between (i) the responsiveness of the vehicle driving torque to the operation of an accelerator pedal and (ii) shock, sound or the like resulting from torque changes (which will be hereinafter comprehensively referred to as "shock") is a trade-off relation. Thus, the responsiveness of the vehicle driving torque is set in accordance with the characteristics required for a vehicle. However, if the responsiveness of the vehicle driving torque is equally set, a special traveling performance with a high level of user satisfaction cannot be achieved in the CD mode.

Accordingly, in order to implement a special traveling performance in the CD mode, it is conceivable to change the responsiveness of the vehicle driving torque to the operation of the accelerator pedal between the CD mode and the CS mode. Specifically, it is conceivable that the responsiveness of the vehicle driving torque to the operation of the accelerator pedal is set to be higher when the CD mode is selected than when the CS mode is selected. However, the change in the responsiveness of the vehicle driving torque resulting from switching between the CD mode and the CS mode may cause the user to feel strangeness.

SUMMARY

Therefore, some embodiments described herein provide a hybrid vehicle by which a special traveling performance can be implemented in the CD mode, and thereby, the strangeness that the user may feel can be reduced.

According to the present disclosure, a hybrid vehicle includes: an internal combustion engine; a power storage device; an electric motor that receives electric power from the power storage device to generate travel driving force; and a control device for selecting one of a CD mode and a CS mode. The control device switches a traveling mode between a first traveling mode (EV traveling) and a second traveling mode (HV traveling) in accordance with a traveling condition in each of the CD mode and the CS mode. In the first traveling mode (EV traveling), the vehicle travels by using the electric motor while stopping the internal combustion engine. In the second traveling mode (HV traveling), the vehicle travels while operating the internal combustion engine. The control device changes responsiveness of a vehicle driving torque to an operation of an accelerator pedal between the CD mode and the CS mode such that the responsiveness is higher in the CD mode than in the CS mode. When the responsiveness is changed in accordance with mode switching between the CD mode and the CS mode, the control device further performs a gradually-changing process for bringing the responsiveness from a value before mode switching close to a value after mode switching as time progresses.

In the present hybrid vehicle, the responsiveness of the vehicle driving torque to the operation of the accelerator pedal is switched between the CD mode and the CS mode. Specifically, the responsiveness of the vehicle driving torque to the operation of the accelerator pedal is higher in the CD mode than in the CS mode. Thereby, a special traveling performance in the CD mode can be implemented. Furthermore, in the present hybrid vehicle, when the responsiveness of the vehicle driving torque is changed in accordance with mode switching, the gradually-changing process is performed, so that strangeness that the user may feel due to a change in the torque responsiveness can be reduced. Therefore, according to the present hybrid vehicle, a special traveling performance can be implemented in the CD mode, and thereby, strangeness that the user may feel can be reduced.

In some embodiments, the control device changes the responsiveness by changing time taken to increase the vehicle driving torque to the operation of the accelerator pedal by a prescribed amount.

By providing such a configuration, the responsiveness can be simply changed in accordance with mode switching.

In some embodiments, when a prescribed time has elapsed since mode switching was performed, the control device raises a change rate of the responsiveness achieved by the gradually-changing process as compared with the change rate before the prescribed time elapses.

In the case where the change amount of the vehicle driving torque is relatively large at the time when the responsiveness is changed in accordance with mode switching, it takes time to change the responsiveness due to the gradually-changing process. As a result, the followability of the vehicle driving torque to the target value may deteriorate. Thus, in the present hybrid vehicle, when a prescribed time has elapsed since mode switching was performed, the change rate of the responsiveness achieved by the gradually-changing process is raised as compared with the change rate before the prescribed time elapses. Thereby, in the case where the change amount of the vehicle driving torque is relatively large, changing of the responsiveness is facilitated, with the result that deterioration in the followability of the vehicle driving torque can be avoided. Therefore, according to the present hybrid vehicle, a special traveling performance can be implemented in the CD mode, and thereby, strangeness that the user may feel can be reduced.

In some embodiments, in a case where a change amount of the vehicle driving torque is relatively large during execution of the gradually-changing process, the control device raises a change rate of the responsiveness achieved by the gradually-changing process as compared with a case where the change amount is relatively small.

By providing such a configuration, when the change amount of the vehicle driving torque is relatively large, changing of the responsiveness of the vehicle driving torque is accelerated, with the result that deterioration in the followability of the vehicle driving torque can be avoided. Therefore, according to the present hybrid vehicle, a special traveling performance can be implemented in the CD mode, and thereby, strangeness that the user may feel can be reduced.

In some embodiments, in a case where an operation amount of the accelerator pedal is equal to or greater than a prescribed value during mode switching, the control device raises the change rate of the responsiveness achieved by the gradually-changing process as compared with a case where the operation amount is smaller than the prescribed value during mode switching.

By providing such a configuration, when the operation amount of the accelerator pedal is relatively large, changing of the responsiveness of the vehicle driving torque is accelerated, with the result that deterioration in the followability of the vehicle driving torque can be avoided. Therefore, according to the present hybrid vehicle, a special traveling performance can be implemented in the CD mode, and thereby, strangeness that the user may feel can be reduced.

In some embodiments, the hybrid vehicle further includes a charging mechanism for charging the power storage device using electric power from a power supply external to the vehicle.

According to the present hybrid vehicle, the fuel efficiency in the CD mode can be improved using electric power supplied from the power supply external to the vehicle while implementing a special traveling performance in the CD mode.

The foregoing and other objects, features, aspects and advantages of the present disclosure will become more apparent from the following detailed description when taken in conjunction with the accompanying drawings.

DETAILED DESCRIPTION

The embodiments of the present disclosure will be hereinafter described in detail with reference to the accompanying drawings. Although a plurality of embodiments and modifications will be described below, it has been originally intended to combine the configurations described in each embodiment and modification as appropriate. In addition, the same or corresponding components are designated by the same reference characters, and description thereof will not be repeated.

First Embodiment

Figure 1:
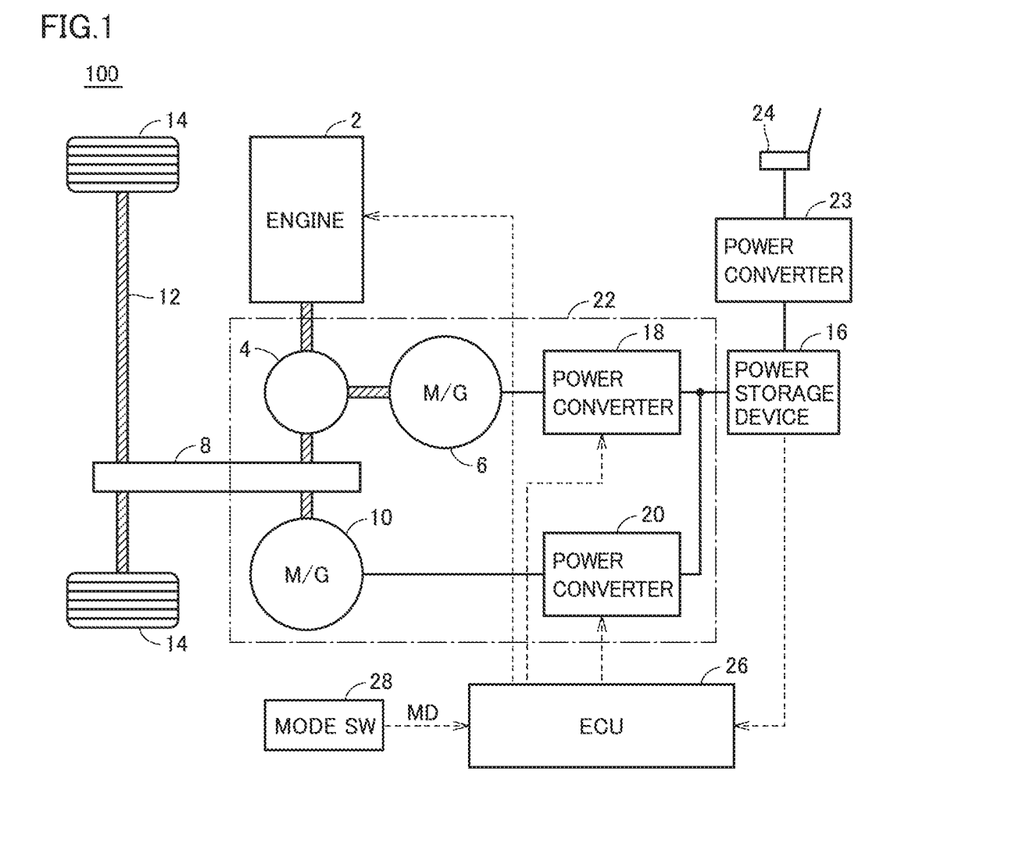
FIG. 1 is a block diagram for illustrating the entire configuration of a hybrid vehicle according to the first embodiment.

FIG. 1 is a block diagram for illustrating the entire configuration of a hybrid vehicle according to the first embodiment. Referring to FIG. 1, a hybrid vehicle 100 includes an engine 2, a drive device 22, a transmission gear 8, a drive shaft 12, a wheel 14, a power storage device 16, an ECU (Electronic Control Unit) 26, and a mode switch (mode SW) 28. Furthermore, hybrid vehicle 100 further includes a power converter 23 and a connection unit 24.

Engine 2 is an internal combustion engine that outputs motive power by converting thermal energy produced by combustion of fuel into kinetic energy of a motion element such as a piston and a rotor. Examples of fuel for engine 2 may be suitably hydrocarbon-based fuel such as gasoline, light diesel oil, ethanol, liquid hydrogen and natural gas, or liquid or gaseous hydrogen fuel.

Drive device 22 includes a power split device 4, motor generators 6 and 10, and power converters 18 and 20. Motor generators 6 and 10 each are an alternating-current (AC) rotating electric machine, and, for example, a three-phase AC synchronous motor having a rotor in which a permanent magnet is embedded. Motor generator 6 is used as a power generator driven by engine 2 via power split device 4 and also used as an electric motor for starting engine 2. Motor generator 10 mainly operates as an electric motor and drives drive shaft 12. On the other hand, when a breaking operation is performed or when acceleration is slowed down while the vehicle is traveling downhill, motor generator 10 operates as a power generator to perform regenerative power generation.

Power split device 4 includes a planetary gear mechanism having three rotation shafts including a sun gear, a carrier, and a ring gear, for example. Power split device 4 divides the driving force of engine 2 into motive power transmitted to the rotation shaft of motor generator 6 and motive power transmitted to transmission gear 8. Transmission gear 8 is coupled to drive shaft 12 for driving wheel 14. Furthermore, transmission gear 8 is coupled also to the rotation shaft of motor generator 10.

Power storage device 16 is a rechargeable direct-current (DC) power supply, which is, for example, formed of a secondary battery such as a nickel-metal hydride or lithium-ion secondary battery, a capacitor with large capacity, and the like. Power storage device 16 supplies electric power to power converters 18 and 20. Furthermore, when receiving electric power generated during power generation of motor generator 6 and/or 10, power storage device 16 is charged. Furthermore, power storage device 16 may be charged with electric power supplied through connection unit 24 from a power supply external to the vehicle.

The state of charge of power storage device 16 is shown by an SOC expressed in percentage of the current power storage amount relative to the fully-charged state of power storage device 16. The SOC is calculated, for example, based on the output voltage and/or the input/output current of power storage device 16 that are detected by a voltage sensor and/or a current sensor that are not shown. The SOC may be calculated by an ECU separately provided in power storage device 16, or may be calculated by an ECU 26 based on the detected value of the output voltage and/or the input/output current of power storage device 16.

Based on the control signal received from ECU 26, power converter 18 performs a bidirectional DC/AC power conversion between motor generator 6 and power storage device 16. Similarly, based on the control signal received from ECU 26, power converter 20 performs a bidirectional DC/AC power conversion between motor generator 10 and power storage device 16. Thereby, motor generators 6 and 10 can output a positive torque used for serving as an electric motor or a negative torque used for serving as a power generator, while transmitting and receiving electric power to and from power storage device 16. Power converters 18 and 20 each are formed of an inverter, for example. In addition, a boost converter for a DC voltage conversion can be arranged between power storage device 16 and each of power converters 18 and 20.

Power converter 23 converts, into a voltage level of power storage device 16, the electric power from an external power supply (not shown) located external to the vehicle and electrically connected to connection unit 24. Power converter 23 outputs the converted power to power storage device 16 (charging of power storage device 16 by an external power supply will be hereinafter also referred to as "external charging"). Power converter 23 is configured, for example, to include a rectifier or an inverter. The method of receiving electric power from the external power supply is not limited to a method of receiving electric power using connection unit 24 in a contact manner, but may be a method of receiving electric power from the external power supply in a contactless manner using a power receiving coil and the like in place of connection unit 24.

ECU 26 includes a CPU (Central Processing Unit), a storage device, and an input/output buffer, and the like (each of which is not shown), and controls each device in hybrid vehicle 100. It is to be noted that the above-described control is not limited to processing by software, but can be carried out by dedicated hardware (an electronic circuit).

As main control by ECU 26, ECU 26 calculates a vehicle driving torque (requested value) based on the vehicle speed and the accelerator pedal position in accordance with the operation of the accelerator pedal, and calculates the vehicle driving power (requested value) based on the calculated vehicle driving torque. Then, ECU 26 further calculates the required charge power for power storage device 16 based on the SOC of power storage device 16, and controls engine 2 and drive device 22 so as to generate power obtained by adding required charge power to the vehicle driving power (which will be hereinafter referred to as "vehicle power").

When the vehicle power is relatively small, ECU 26 controls drive device 22 so as to cause the vehicle to travel using only motor generator 10 while stopping engine 2 (EV traveling). When the vehicle power is relatively large, ECU 26 controls engine 2 and drive device 22 so as to cause the vehicle to travel while operating engine 2 (HV traveling).

In this case, ECU 26 controls traveling of the vehicle by selectively applying a CD (Charge Depleting) mode and a CS (Charge Sustaining) mode. In the CD mode, the SOC of power storage device 16 is actively consumed by mainly executing EV traveling while allowing HV traveling. In the CS mode, the SOC is controlled so as to fall within a prescribed range by switching the traveling mode between HV traveling and EV traveling as appropriate.

Figure 2:
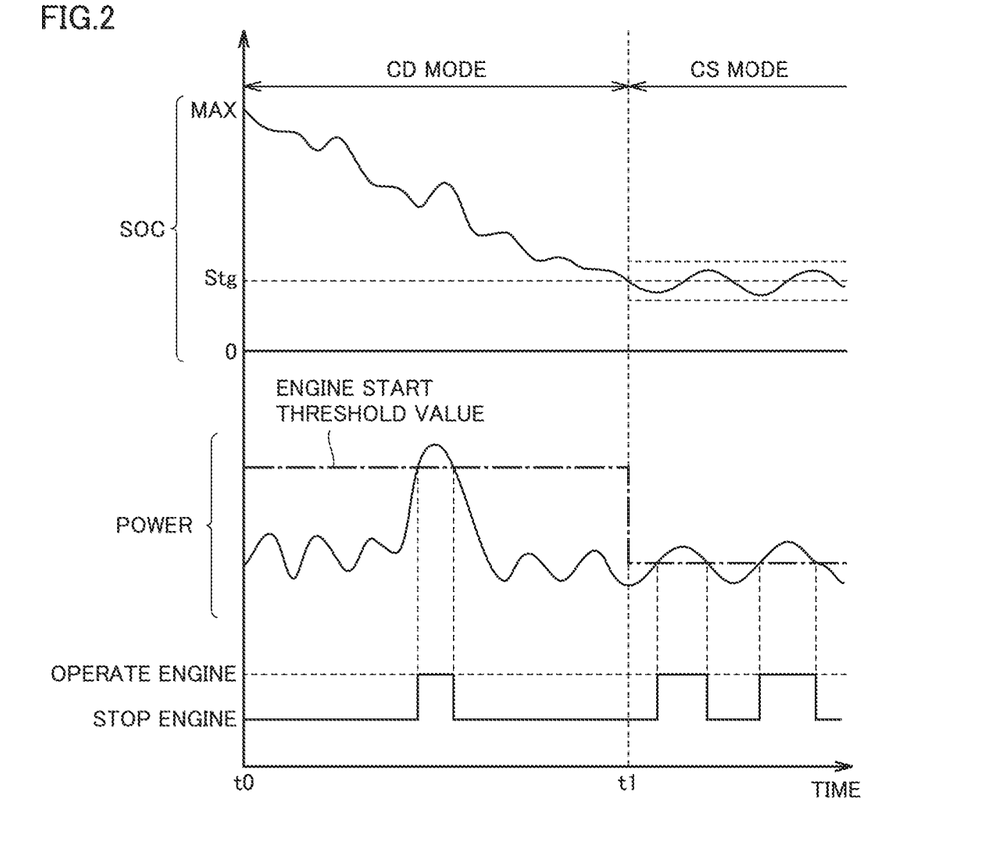
FIG. 2 is a diagram for illustrating a CD mode and a CS mode.

FIG. 2 is a diagram for illustrating the CD mode and the CS mode. Referring to FIG. 2, after power storage device 16 is brought into a fully-charged state (SOC=MAX) by external charging from the external power supply, the vehicle is started to travel in the CD mode.

In the CD mode, the SOC of power storage device 16 is actively consumed, and basically, the electric power stored in power storage device 16 (electric energy mainly by external charging) is consumed. While the vehicle travels in the CD mode, the operation of engine 2 for maintaining the SOC is not carried out. Specifically, the required charge power of power storage device 16 is set at zero, for example, when the CD mode is selected. Thereby, although the SOC increases temporarily by regenerative electric power recovered during deceleration and the like of the vehicle or by the electric power generated by operating engine 2, the proportion of discharging is consequently relatively greater than that of charging. Thus, as a whole, the SOC decreases as the travelling distance increases.

In the CS mode, the SOC of power storage device 16 is controlled so as to fall within a prescribed range. By way of example, at time t1, when the SOC decreases to a prescribed value Stg showing a decrease of the SOC, the CS mode is selected. Then, the subsequent SOC is maintained in a prescribed range. Specifically, engine 2 operates as the SOC decreases (HV traveling), and engine 2 stops as the SOC increases (EV traveling). In other words, in the CS mode, engine 2 operates for maintaining the SOC.

According to this hybrid vehicle 100, when the vehicle power is smaller than a prescribed engine start threshold value, the vehicle travels by using motor generator 10 while stopping engine 2 (EV traveling). On the other hand, when the vehicle power exceeds the above-described engine start threshold value, the vehicle travels while operating engine 2 (HV traveling). In HV traveling, hybrid vehicle 100 travels using the driving force from engine 2 in addition to the driving force from motor generator 10 or in place of motor generator 10. The electric power generated by motor generator 6 in association with the operation of engine 2 during HV traveling is directly supplied to motor generator 10 or is stored in power storage device 16.

In some embodiments, the engine start threshold value in the CD mode is set to be greater than the engine start threshold value in the CS mode. In other words, in some embodiments the region in which hybrid vehicle 100 travels in the EV traveling mode in the CD mode is greater than the region in which hybrid vehicle 100 travels in the EV traveling mode in the CS mode. Thereby, in the CD mode, the frequency that engine 2 is started can be suppressed and the opportunity for EV traveling can be further increased, as compared with the CS mode. On the other hand, in the CS mode, hybrid vehicle 100 can be controlled to efficiently travel using both of engine 2 and motor generator 10.

Also in the CD mode, engine 2 operates when the vehicle power (equal to the vehicle driving power) exceeds the engine start threshold value. In addition, even if the vehicle power does not exceed the engine start threshold value, the operation of engine 2 may be permitted, for example, during warm-up or the like of engine 2 or an exhaust catalyst. On the other hand, also in the CS mode, engine 2 stops when the SOC increases. In other words, the CD mode is not limited to EV traveling in which the vehicle travels while keeping engine 2 stopped, and the CS mode is also not limited to HV traveling in which the vehicle travels while keeping engine 2 operating. EV traveling and HV traveling each can be carried out both in the CD mode and in the CS mode.

Again referring to FIG. 1, mode switch 28 serves as an input device for allowing the user to select one of the CD mode and the CS mode. Mode switch 28 outputs a signal MD to ECU 26 in response to the mode selected by the user's operation. It is to be noted that this mode switch 28 is not indispensable.

Then, ECU 26 changes the responsiveness of the vehicle driving torque to the operation of the accelerator pedal in accordance with mode switching between the CD mode and the CS mode. Specifically, based on the SOC or in response to the driver's operation of mode switch 28, ECU 26 sets the responsiveness of the vehicle driving torque to the operation of the accelerator pedal to be higher when the CD mode is selected than when the CS mode is selected. By changing the torque responsiveness in accordance with mode switching in this way, a special traveling performance in the CD mode can be implemented, which will be hereinafter described in detail.

Figure 3:
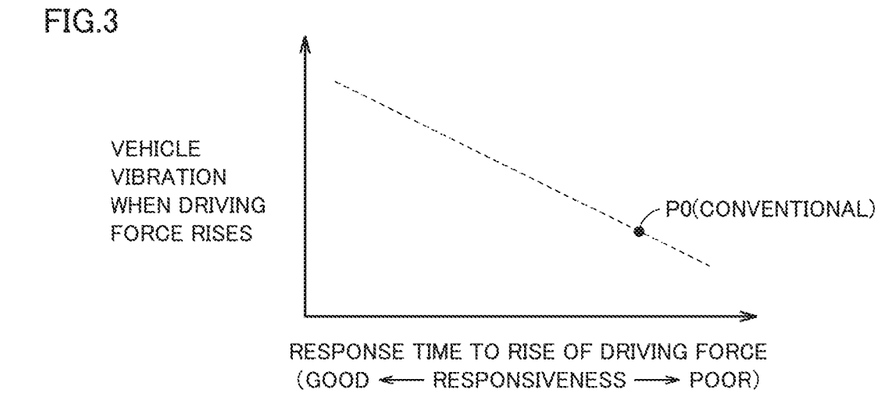
FIG. 3 is a diagram showing a setting of driving force responsiveness in a conventional hybrid vehicle as a comparative example.

FIG. 3 is a diagram showing a setting of the driving force responsiveness in a conventional hybrid vehicle as a comparative example. Referring to FIG. 3, the horizontal axis shows the time period from when the accelerator pedal is pressed until when the driving force (vehicle driving torque) is increased by a prescribed amount, that is, the responsiveness of the vehicle driving torque to the operation of the accelerator pedal. The vertical axis shows the magnitude of vehicle vibration at the time when the driving force is increased by a prescribed amount due to the operation of the accelerator pedal, that is, the magnitude of shock caused by a change in the vehicle driving torque. In addition, shock is caused by tooth hitting and the like resulting from torsion in a drive shaft or a gear system, and backlash in a gear that occur at the time when the vehicle driving torque changes.

The dotted line shows that the responsiveness of the vehicle driving torque to the operation of the accelerator pedal and the magnitude of shock caused by a change in the vehicle driving torque establish a trade-off relation. According to the conventional hybrid vehicle, for example, in order to give a priority to shock reduction, the responsiveness of the vehicle driving torque to the operation of the accelerator pedal is set equally at a point indicated as a point P0 (the point at which the responsiveness is suppressed).

Figure 4:
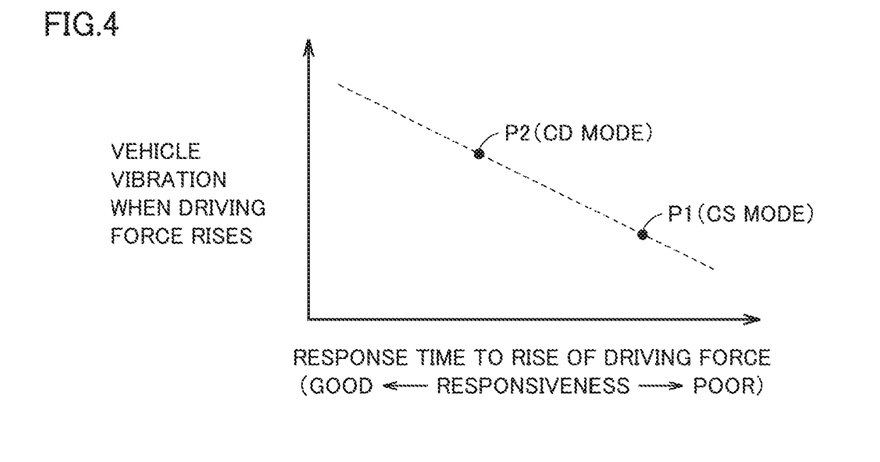
FIG. 4 is a diagram showing a setting of the driving force responsiveness in the hybrid vehicle according to the first embodiment.

FIG. 4 is a diagram showing a setting of the driving force responsiveness in hybrid vehicle 100 according to the first embodiment. This FIG. 4, which corresponds to FIG. 3, shows a horizontal axis and a vertical axis corresponding to those shown in FIG. 3. Referring to FIG. 4, a point P1 shows a setting of the driving force responsiveness when the CS mode is selected, and a point P2 shows a setting of the driving force responsiveness when the CD mode is selected. In other words, in hybrid vehicle 100 according to the present first embodiment, the setting of the driving force responsiveness is switched between when the CD mode is selected and when the CO mode is selected. Specifically, the responsiveness of the vehicle driving torque to the operation of the accelerator pedal is higher in the CD mode than in the CS mode.

Generally, the responsiveness of the motor generator is higher than the responsiveness of the engine, and the required torque responsiveness is different between the CD mode in which the vehicle travels mainly in the EV traveling mode and the CS mode in which HV traveling and EV traveling are switched as appropriate to control the SOC to fall within a prescribed range. However, if the responsiveness of the vehicle driving torque is equally set like the conventional hybrid vehicle as shown in FIG. 3, a special traveling performance with a high level of user satisfaction cannot be implemented in the CD mode.

Therefore, in hybrid vehicle 100 according to the present first embodiment, as shown in FIG. 4, the setting of the driving force responsiveness is switched between the CD mode and the CS mode. Then, the responsiveness of the vehicle driving torque to the operation of the accelerator pedal is set to be higher in the CD mode than in the CS mode. Thereby, in the CD mode in which the vehicle travels mainly in the EV traveling mode, a special traveling performance can be implemented while sufficiently utilizing high responsiveness of the motor generator. Also, in the CS mode, the responsiveness in accordance with the conventional hybrid vehicle can be set (suppressing shock).

Figure 5:
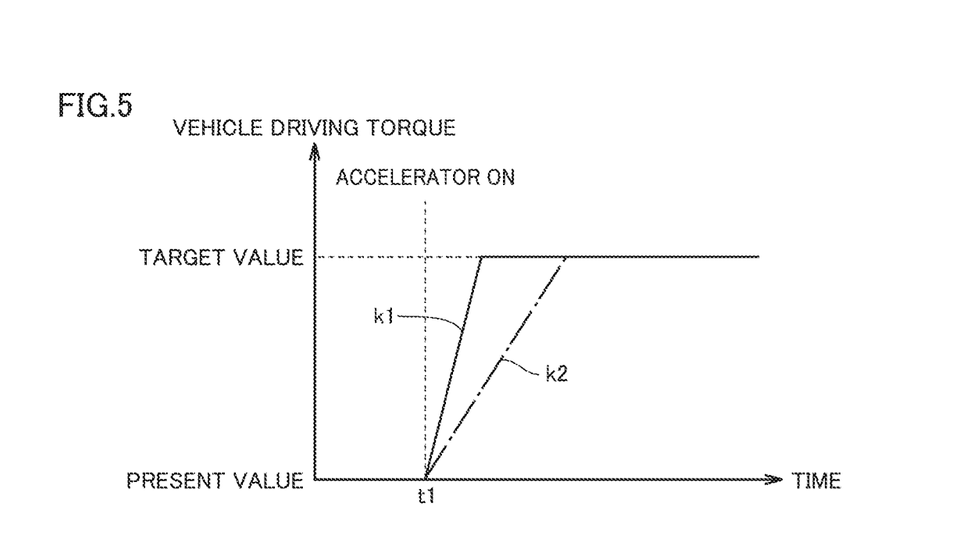
FIG. 5 is a diagram for illustrating a high-low level of the driving force responsiveness.

FIG. 5 is a diagram for illustrating a high-low level of the driving force responsiveness. Referring to FIG. 5, the horizontal axis shows time while the vertical axis shows a vehicle driving torque. At time t1, the accelerator pedal is pressed, and the target value of the vehicle driving torque is changed (increased) according to this pedal pressing.

A line k1 shows a change in the vehicle driving torque when the driving force responsiveness is relatively high, and specifically shows a change in the vehicle driving torque when the CD mode is selected in which the driving force responsiveness as designated by a point P2 in FIG. 4 is set. A line k2 shows a change in the vehicle driving torque when the driving force responsiveness is relatively low, and specifically shows a change in the vehicle driving torque when the CS mode is selected in which the driving force responsiveness as designated by a point P1 in FIG. 4 is set.

In this way, according to this hybrid vehicle 100, the responsiveness of the vehicle driving torque to the operation of the accelerator pedal is set to be higher in the CD mode than in the CS mode, so that a special traveling performance can be implemented in the CD mode.

Again referring to FIG. 1, ECU 26 performs switching of the driving force responsiveness in accordance with mode switching. In other words, ECU 26 performs a process for limiting the change rate of the vehicle driving torque (requested value) calculated based on the vehicle speed and the accelerator pedal position in accordance with the operation of the accelerator pedal. The responsiveness of the vehicle driving torque is determined by this process. Then, ECU 26 switches, between the CD mode and the CS mode, a setting for defining a limitation on the change rate of the vehicle driving torque in the above-described process, thereby setting the responsiveness of the vehicle driving torque to be higher in the CD mode than in the CS mode.

The above-described process is, for example, a rating process for limiting the change rate of the vehicle driving torque, and a "filtering" process for performing a delaying process by a delay filter or the like. Then, ECU 26 switches the responsiveness of the vehicle driving torque between the CD mode and the CS mode for example by switching, in accordance with the mode, the limit value of the change rate of the vehicle driving torque in the above-described rating process or the time constant in the above-described filtering process.

When the responsiveness of the vehicle driving torque is changed in accordance with mode switching, ECU 26 further performs the gradually-changing process for bringing the responsiveness from the value before mode switching closer to the value after mode switching as time progresses. In other words, by changing the responsiveness of the vehicle driving torque in accordance with mode switching, a special traveling performance with high torque responsiveness to the accelerator pedal operation can be implemented in the CD mode. However, the user may feel strangeness due to a change in the responsiveness of the vehicle driving torque in accordance with mode switching. Thus, according to the present hybrid vehicle 100, the above-described gradually-changing process is performed when the responsiveness of the vehicle driving torque is changed in accordance with mode switching. Thereby, the strangeness that the user may feel due to a change in the torque responsiveness is reduced.

In the case where the change amount of the vehicle driving torque is relatively large at the time when the responsiveness is changed in accordance with mode switching, it takes time to change the responsiveness due to the above-described gradually-changing process. As a result, the followability of the vehicle driving torque to the target value may deteriorate. Thus, in hybrid vehicle 100 according to the present first embodiment, when a prescribed time has elapsed since mode switching was performed, the change rate of the responsiveness achieved by the gradually-changing process is raised as compared with the change rate before the prescribed time elapses. Thereby, when the change amount of the vehicle driving torque is relatively large, changing of the responsiveness is facilitated, with the result that deterioration in the followability of the vehicle driving torque can be avoided. Therefore, according to the present hybrid vehicle 100, a special traveling performance can be implemented in the CD mode, and thereby, strangeness that the user may feel can be reduced.

In addition, in the above-described gradually-changing process, the responsiveness of the vehicle driving torque is changed so as to be brought from the value before mode switching closer to the value after mode switching as time progresses, which means that changing of the responsiveness from the value before mode switching to the value after mode switching is performed not in an instant step-wise manner. The gradually-changing process is, for example, a rating process for limiting the change rate of the responsiveness, a "filtering" process for performing a delaying process by a delay filter or the like, a process of changing the above-described responsiveness in a step-wise manner, and the like.

Figure 6:
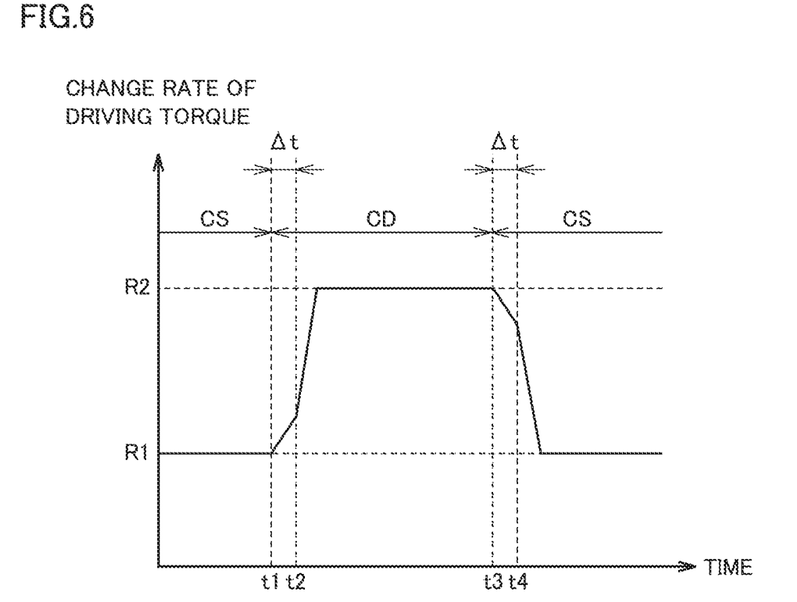
FIG. 6 is a diagram showing the manner of a gradually-changing process at the time when the responsiveness of the vehicle driving torque is changed in accordance with mode switching.

FIG. 6 is a diagram showing the manner of a gradually-changing process at the time when the responsiveness of the vehicle driving torque is changed in accordance with mode switching. In this case, an explanation will be hereinafter given representatively with regard to the case where the gradually-changing process is implemented by the rating process for limiting the change rate of the responsiveness of the vehicle driving torque. Referring to FIG. 6, the vertical axis shows a change rate (responsiveness) of the vehicle driving torque while the horizontal axis shows time. A value R1 shows the change rate (responsiveness) of the vehicle driving torque in the CS mode. A value R2 (R2>R1) shows the change rate (responsiveness) of the vehicle driving torque in the CD mode.

When the traveling mode is switched from the CS mode to the CD mode at time t1, switching of the change rate of the vehicle driving torque is started. The change rate of the vehicle driving torque is switched from R1 to R2 not in a step-wise manner but at a prescribed rate. As to the rate during switching, the rate from time t1 to time t2 at which a prescribed time $\Delta t$ has elapsed is defined as the first rate, and the rate at and after time t2 is defined as the second rate that is higher in change rate than the first rate.

The gradually-changing process is intended to gradually switch the responsiveness of the vehicle driving torque for the purpose of reducing the strangeness that the user may feel due to a change in the torque responsiveness. In the case where the change amount of the vehicle driving torque is relatively large at the time when the responsiveness is changed (when the accelerator pedal position is relatively large), however, it takes time to change the responsiveness due to the gradually-changing process. As a result, the followability of the vehicle driving torque to the target value may deteriorate. Thus, in the present first embodiment, when prescribed time $\Delta t$ has elapsed since mode switching was performed, the change rate of the gradually-changing process is raised. Thereby, the strangeness that the user may feel due to a change in the torque responsiveness can be reduced while suppressing deterioration in the torque followability at the time when the change amount of the vehicle driving torque is relatively large.

It is to be noted that prescribed time $\Delta t$ can be set as appropriate in consideration of the magnitude of the change rate (R1, R2) of the vehicle driving torque, the followability of the vehicle driving torque to the target value, and the like.

Figure 7:
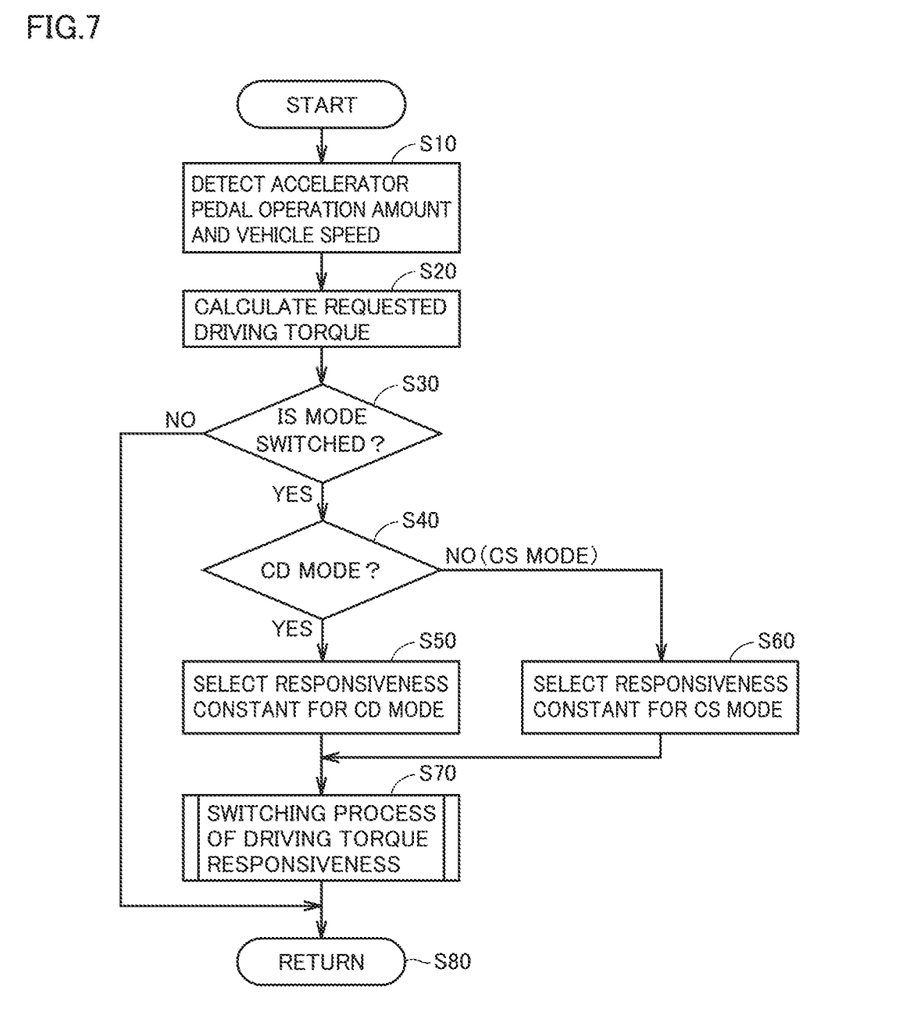
FIG. 7 is a flowchart for illustrating a procedure of a process of computing a vehicle driving torque (requested value), which is performed by an ECU.

FIG. 7 is a flowchart for illustrating a process of computing the vehicle driving torque (requested value), which is performed by ECU 26 shown in FIG. 1. The process shown in this flowchart is performed as it is called from a main routine and executed at regular intervals or every time predetermined conditions are satisfied.

Referring to FIG. 7, ECU 26 receives detected values of the operation amount of the accelerator pedal and the vehicle speed (step S10). It is to be noted that the operation amount of the accelerator pedal is detected by an accelerator position sensor (not shown), and the vehicle speed is detected, for example, by a vehicle speed sensor detecting a vehicle speed by detecting the rotation speed of the axle shaft.

Then, ECU 26 calculates the requested driving torque (requested value of the vehicle driving torque) of the vehicle based on the accelerator pedal operation amount and the vehicle speed that have been detected (step S20). It is to be noted that the requested driving torque can be calculated based on the detected accelerator pedal operation amount and vehicle speed, by using a map and the like defining the relation among the accelerator pedal position in accordance with the accelerator pedal operation amount, the vehicle speed and the vehicle driving torque.

Then, ECU 26 determines whether or not the mode has been switched between the CD mode and the CS mode (step S30). For example, the mode may be switched based on the SOC as shown in FIG. 2 or in response to the user's operation of mode switch 28 (FIG. 1). Then, when it is determined in step S30 that mode has been switched (YES in step S30), ECU 26 determines whether or not the CD mode is selected (step S40). In this case, it may be determined whether or not the CS mode is selected.

Then, when it is determined that the CD mode is selected (YES in step S40), ECU 26 selects the responsiveness constant for the CD mode (for example, value R2 in FIG. 6) as a responsiveness constant determining the responsiveness of the vehicle driving torque (step S50). On the other hand, when it is determined in step S40 that the CS mode is selected (NO in step S40), ECU 26 selects the responsiveness constant for the CS mode (for example, value R1 in FIG. 6) as the above-described responsiveness constant (step S60). In addition, the responsiveness constant for each of the CD mode and the CS mode is set such that the responsiveness of the requested driving torque is higher in the CD mode than in the CS mode.

Then, when the responsiveness constant after mode switching is selected in step S50 or step S60, ECU 26 performs the switching process of the responsiveness of the vehicle driving torque (step S70). In this switching process of the driving torque responsiveness, the gradually-changing process is performed for bringing the responsiveness of the vehicle driving torque from the value before mode switching closer to the value after mode switching as time progresses. The details of the switching process of the driving torque responsiveness will be described later.

In addition, when it is determined in step S30 that the mode has not been switched (NO in step S30), ECU 26 advances the process to step S80 without performing steps S40 to S70.

Figure 8:
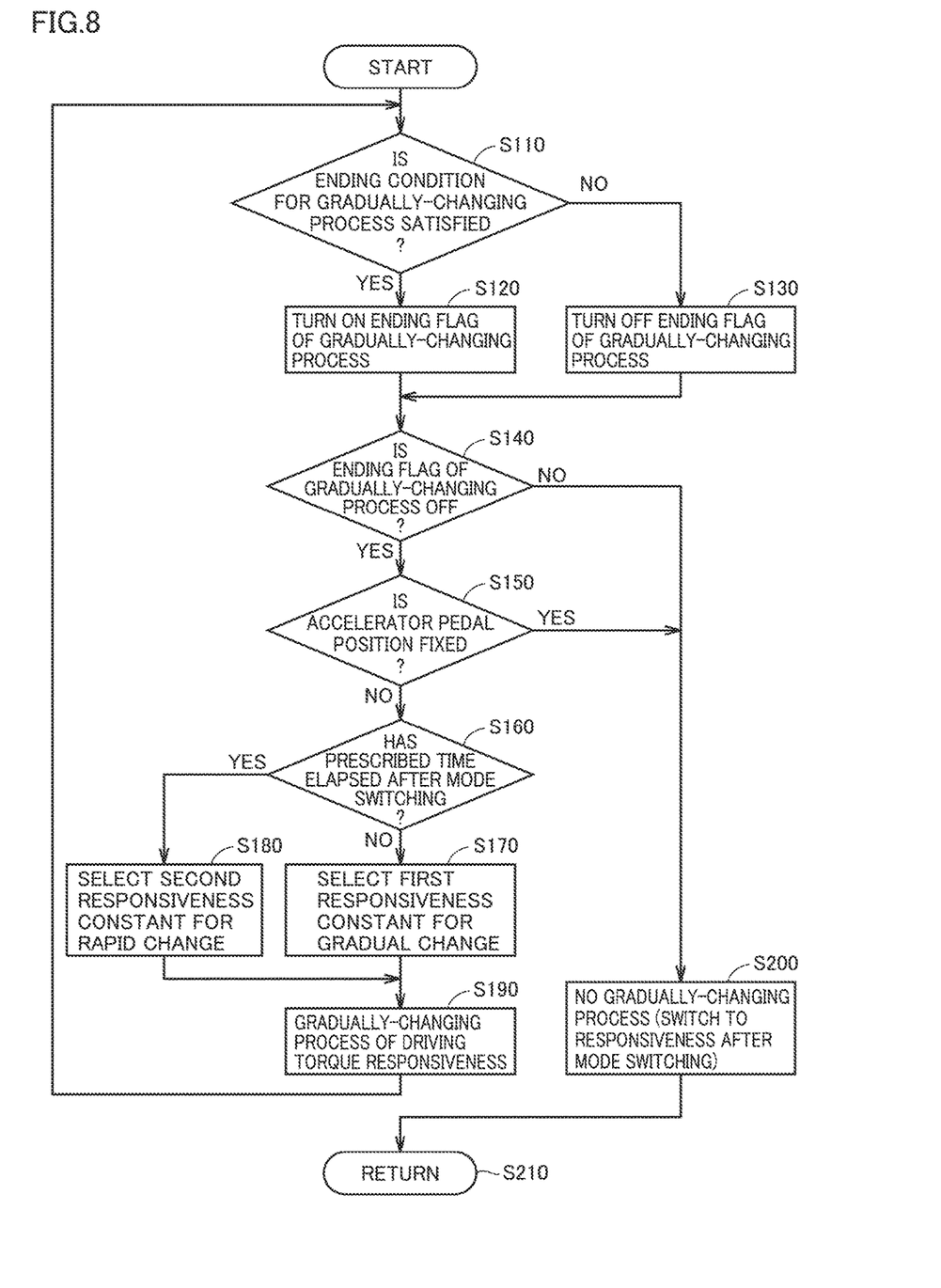
FIG. 8 is a flowchart for illustrating a procedure of a process of switching driving torque responsiveness shown in FIG. 7.

FIG. 8 is a flowchart for illustrating the procedure of a switching process of the driving torque responsiveness shown in FIG. 7. Referring to FIG. 8, ECU 26 determines whether the ending condition for the gradually-changing process is satisfied or not (step S110). The gradually-changing process is performed for changing the responsiveness of the vehicle driving torque so as to be brought from the value before mode switching closer to the value after mode switching as time progresses. Then, for example, when the difference between the responsiveness of the requested driving torque after mode switching (a target value after switching) and the current value of the responsiveness of the requested driving torque is equal to or less than a prescribed value, the ending condition for the gradually-changing process is satisfied.

When it is determined in step S110 that the ending condition for the gradually-changing process has been satisfied (YES in step S110), ECU 26 turns ON an ending flag of gradually-changing process (step S120). On the other hand, when it is determined in step S110 that the ending condition for the gradually-changing process has not been satisfied (NO in step S110), ECU 26 turns OFF the ending flag of gradually-changing process (step S130). It is to be noted that a ending flag of gradually-changing process is OFF immediately after the process of switching the driving torque responsiveness is started.

Then, ECU 26 determines whether or not the ending flag of gradually-changing process is OFF (step S140). Then, when it is determined that the ending flag of gradually-changing process is OFF (YES in step S140), ECU 26 further determines whether or not the accelerator pedal position is fixed (step S150). The determination as to whether the accelerator pedal position is fixed is made depending not on whether the accelerator pedal position is strictly fixed, but on whether the fluctuation width of the accelerator pedal position falls within a certain range in a certain period of time, on whether the difference between the actual value (estimate value) and the target value of the vehicle driving torque falls within a certain range, and the like.

When it is determined in step S150 that the accelerator pedal position is fixed (YES in step S150), ECU 26 advances the process to step S200 without performing the gradually-changing process in step S190 described below because the user does not feel any strangeness even if the responsiveness of the vehicle driving torque is immediately switched in accordance with mode switching. In other words, when it is determined that the accelerator pedal position is fixed during mode switching, the responsiveness of the vehicle driving torque is immediately switched to the responsiveness after mode switching.

When it is determined in step S150 that the accelerator pedal position is not fixed (NO in step S150), ECU 26 determines whether or not prescribed time Δt (FIG. 6) has elapsed after mode switching (step S160). When prescribed time Δt has not elapsed after mode switching (NO in step S160), ECU 26 selects the first responsiveness constant for gradual change as a responsiveness constant used in the gradually-changing process, which is performed in step S190 described below (step S170). On the other hand, when it is determined that prescribed time Δt has elapsed after mode switching (YES in step S160), ECU 26 selects the second responsiveness constant for abrupt change as a responsiveness constant used in the gradually-changing process, which is performed in step S190 (step S180).

When the responsiveness constant is selected in step S170 or S180, ECU 26 performs a gradually-changing process for changing the responsiveness of the vehicle driving torque so as to be brought from the value before mode switching closer to the value after mode switching (step S190). Specifically, for changing the responsiveness of the requested driving torque in accordance with mode switching, ECU 26 performs a rating process for limiting the change rate of the torque responsiveness, a "filtering" process for performing a delaying process by a delay filter or the like, a process of changing the responsiveness in a step-wise manner, and the like. Then, ECU 26 returns the process to step S110.

Then, when it is determined in step S140 that the ending flag of gradually-changing process is ON (NO in step S140), ECU 26 does not allow execution of the above-described gradually-changing process (step S200). In other words, the responsiveness of the requested driving torque is immediately changed into the responsiveness after mode switching (the responsiveness target value after switching).

As described above, in the present first embodiment, the responsiveness of the vehicle driving torque to the operation of the accelerator pedal is switched between the CD mode and the CS mode. Specifically, the responsiveness of the vehicle driving torque to the operation of the accelerator pedal is higher in the CD mode than in the CS mode. Therefore, a special traveling performance with a high level of user satisfaction in the CD mode can be provided. Furthermore, in the present first embodiment, the strangeness that the user may feel due to a change in the torque responsiveness is reduced by performing the gradually-changing process when the responsiveness of the vehicle driving torque is changed in accordance with mode switching.

Furthermore, in the present first embodiment, when prescribed time Δt has elapsed since mode switching was performed, the change rate of the above-described responsiveness achieved by the gradually-changing process is raised as compared with the change rate before prescribed time Δt elapses. Thereby, when the change amount of the vehicle driving torque is relatively large, changing of the responsiveness is facilitated, with the result that deterioration in the followability of the vehicle driving torque can be avoided. Therefore, according to the present first embodiment, a special traveling performance can be implemented in the CD mode, and thereby, the strangeness that the user may feel can be reduced.

Second Embodiment

In the above-described first embodiment, when prescribed time Δt has elapsed since mode switching was performed, the responsiveness switching rate in the gradually-changing process at the time when switching the responsiveness of the vehicle driving torque is raised as compared with the switching rate before prescribed time Δt elapses. Accordingly, deterioration in the followability of the torque can be avoided in the case where the torque change amount is relatively large at the time when the torque responsiveness is changed in accordance with mode switching.

In the present second embodiment, it is determined at the time of mode switching whether the change amount of the vehicle driving torque is large or small. Then, when the torque change amount at the time of mode switching is relatively large, the responsiveness change rate in the gradually-changing process at the time when the torque responsiveness is changed in accordance with mode switching is raised as compared with the case where the torque change amount is relatively small.

Figure 9:
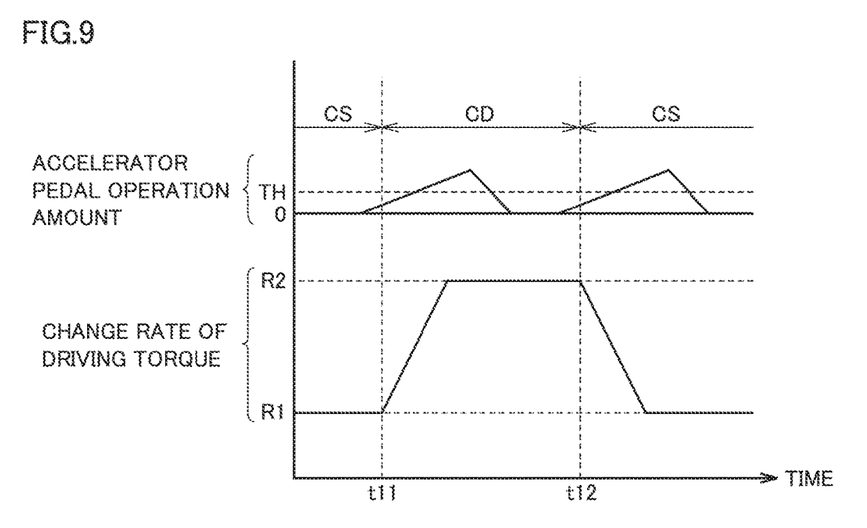
FIG. 9 is a diagram showing the manner of the gradually-changing process at the time when the torque responsiveness is changed in accordance with mode switching in the case where the accelerator pedal operation amount is relatively small during mode switching, according to the second embodiment.
Figure 10:
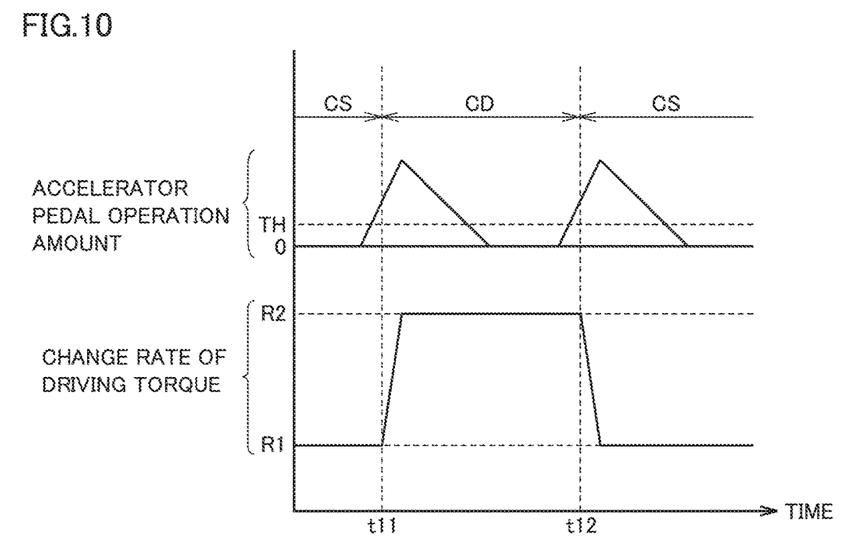
FIG. 10 is a diagram showing the manner of the gradually-changing process at the time when the torque responsiveness is changed in accordance with mode switching in the case where the accelerator pedal operation amount is relatively large during mode switching.

FIG. 9 is a diagram showing the manner of a gradually-changing process at the time when the torque responsiveness is changed in accordance with mode switching in the case where the accelerator pedal operation amount is relatively small during mode switching. On the other hand, FIG. 10 is a diagram showing the manner of a gradually-changing process when the torque responsiveness is changed in accordance with mode switching in the case where the accelerator pedal operation amount is relatively large during mode switching. It is to be noted that an explanation will be hereinafter given representatively with regard to the case where the gradually-changing process is implemented by the rating process for limiting the change rate of the responsiveness of the vehicle driving torque.

Referring to FIG. 9, value R1 shows the change rate (responsiveness) of the vehicle driving torque in the CS mode. Value R2 (R2>R1) shows the change rate (responsiveness) of the vehicle driving torque in the CD mode. When the CS mode is switched to the CD mode at time t11, switching of the change rate (responsiveness) of the vehicle driving torque is started. Switching of the change rate (responsiveness) of the vehicle driving torque from R1 to R2 (R2>R1) is performed not in a step-wise manner but at a prescribed rate.

In this case, the accelerator pedal operation amount at time t11 is smaller than a threshold value TH. Thus, it is determined that the change amount of the vehicle driving torque during mode switching is relatively small. Therefore, the first rate for gradual change is employed as a switching rate used when the change rate (responsiveness) of the vehicle driving torque is changed in accordance with mode switching.

Referring to FIG. 10, when the accelerator pedal operation amount at time t11 is equal to or greater than threshold value TH, it is determined that the change amount of the vehicle driving torque during mode switching is relatively large. Therefore, the second rate for abrupt change that is higher in change rate than the above-described first rate is employed as a switching rate used when the change rate (responsiveness) of the vehicle driving torque is changed in accordance with mode switching. Accordingly, in the case where the torque change amount is relatively large at the time when the torque responsiveness is switched in accordance with mode switching, deterioration in the followability of the torque can be avoided.

The entire configuration of the hybrid vehicle according to the present second embodiment is the same as hybrid vehicle 100 shown in FIG. 1. Furthermore, the entire flow of the process of computing the vehicle driving torque (requested value) that is performed by ECU 26 in the present second embodiment is shown in the flowchart shown in FIG. 7. This second embodiment is different in the procedure of the switching process of the driving torque responsiveness shown in FIG. 8 from the first embodiment.

Figure 11:
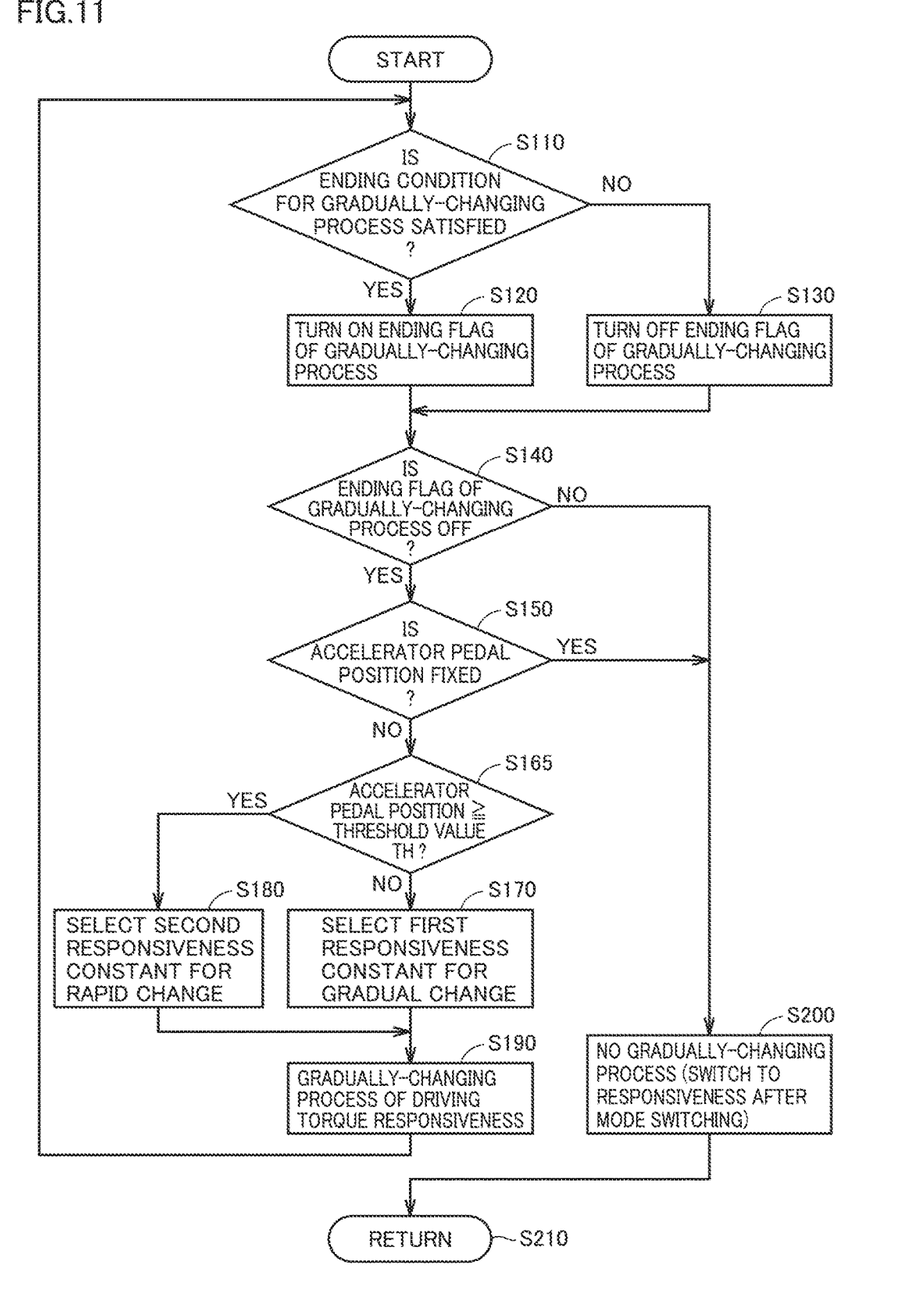
FIG. 11 is a flowchart for illustrating the procedure of a process of switching driving torque responsiveness according to the second embodiment.

FIG. 11 is a flowchart for illustrating the procedure of a switching process of the driving torque responsiveness according to the second embodiment. Referring to FIG. 11, this flowchart corresponds to the flowchart shown in FIG. 8 that includes step S165 in place of step S160.

Specifically, when it is determined in step S150 that the accelerator pedal position is not fixed (NO in step S150), ECU 26 determines whether or not the accelerator pedal position is equal to threshold value TH (step S165). When it is determined that the accelerator pedal position is smaller than threshold value TH (NO in step S165), it is determined that the change amount of the vehicle driving torque during mode switching is relatively small, and then, the process is advanced to step S170. In other words, the first responsiveness constant for gradual change is selected as a responsiveness constant used in the gradually-changing process performed in step S190.

On the other hand, when it is determined in step S165 that the accelerator pedal position is equal to or greater than threshold value TH (YES in step S165), it is determined that the change amount of the vehicle driving torque during mode switching is relatively large, and then, the process is advanced to step S180. In other words, the second responsiveness constant for abrupt change is selected as a responsiveness constant used in the gradually-changing process performed in step S190. It is to be noted that the process in each of other steps is as described with reference to FIG. 8.

In the above description, it is determined whether or not the accelerator pedal position during mode switching is equal to or greater than threshold value TH, thereby determining whether or not the change amount of the vehicle driving torque during mode switching is relatively large. However, this determination may be made directly by the vehicle driving torque in place of the accelerator pedal position. The responsiveness constant used in the gradually-changing process performed in step S190 may be switched, for example, depending on whether or not the change amount of the requested driving torque during mode switching is equal to or greater than the prescribed threshold value.

As described above, in the present second embodiment, when the operation amount of the accelerator pedal is relatively large (when the change amount of the vehicle driving torque is relatively large), changing of the responsiveness of the vehicle driving torque is accelerated, with the result that deterioration in the followability of the vehicle driving torque can be avoided. Therefore, according to the present second embodiment, a special traveling performance can be implemented in the CD mode, and thereby, strangeness that the user may feel can be reduced.

In each of the above-described embodiments, an explanation has been given with regard to the control in hybrid vehicle 100 (FIG. 1) having a configuration in which engine 2 and two motor generators 6 and 10 are coupled by power split device 4. However, the hybrid vehicle to which the present disclosure is applied is not limited to such a configuration.

Figure 12:
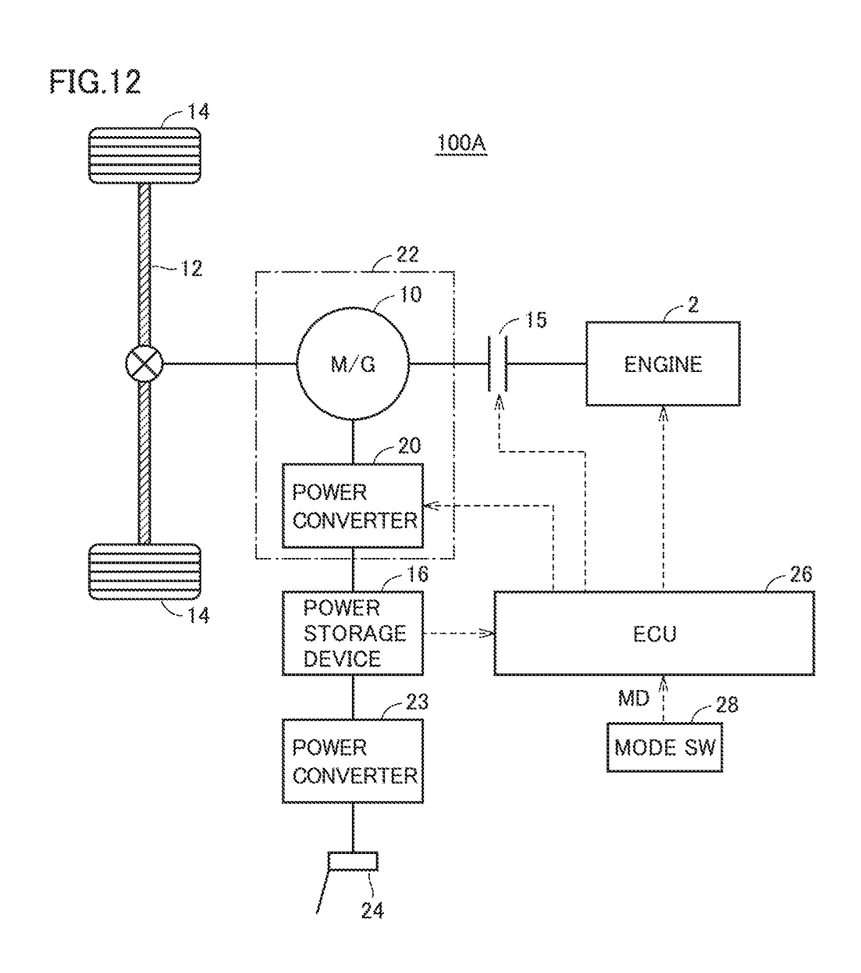
FIG. 12 is a block diagram illustrating a modification of the entire configuration of the hybrid vehicle.

For example, the control having been described in each of the above-described embodiments can be applicable also to a hybrid vehicle 100A having a configuration in which engine 2 and one motor generator 10 are coupled in series via a clutch 15, as shown in FIG. 12.

Furthermore, although not particularly shown, the present disclosure is applicable also to the so-called series type hybrid vehicle that uses engine 2 only for driving motor generator 6 and generates vehicle driving force only by motor generator 10.

Furthermore, although hybrid vehicle 100 (100A) has been described in the above-described embodiments as a hybrid vehicle including power storage device 16 that is externally chargeable by an external power supply, the present disclosure is applicable also to a hybrid vehicle that does not have an external charging mechanism (power converter 23 and connection unit 24). The CD mode/CS mode is suitable for an externally-chargeable hybrid vehicle, but is not necessarily limited only to such an externally-chargeable hybrid vehicle.

In the above description, engine 2 corresponds to one embodiment of the "internal combustion engine" in the present disclosure, and motor generator 10 corresponds to one embodiment of the "electric motor" in the present disclosure. Furthermore, ECU 26 corresponds to one embodiment of the "control device" in the present disclosure, and power converter 23 and connection unit 24 form one embodiment of the "charging mechanism" in the present disclosure.

Although the embodiments of the present disclosure have been described, it should be understood that the embodiments disclosed herein are illustrative and non-restrictive in every respect. The scope of the claimed subject matter is defined by the terms of the claims, and is intended to include any modifications within the meaning and scope equivalent to the terms of the claims.

What is claimed is:

1. A hybrid vehicle comprising:
   an internal combustion engine;
   a power storage device;
   an electric motor configured to receive electric power from the power storage device to generate travel driving force; and
   a control device configured to select one of a CD (Charge Depleting) mode and a CS (Charge Sustaining) mode, and to switch a traveling mode between a first traveling mode and a second traveling mode in accordance with a traveling condition in each of the CD mode and the CS mode so as to cause the hybrid vehicle to travel, in the first traveling mode by using the electric motor while stopping the internal combustion engine, and in the second traveling mode by operating the internal combustion engine,
   the control device configured to change responsiveness of a vehicle driving torque to an operation of an accelerator pedal between the CD mode and the CS mode such that the responsiveness is higher in the CD mode than in the CS mode,
   when the responsiveness is changed in accordance with mode switching between the CD mode and the CS mode, the control device further performing a changing process for bringing the responsiveness from a first value before the mode switching closer to a second value after the mode switching as time progresses.

2. The hybrid vehicle according to claim 1, wherein
   the control device changes the responsiveness by changing time taken to increase the vehicle driving torque in response to the operation of the accelerator pedal by a prescribed amount.

3. The hybrid vehicle according to claim 1, wherein
   when a prescribed time has elapsed since the mode switching was performed, the control device raises a change rate of the responsiveness achieved by the changing process as compared with the change rate before the prescribed time elapses.

4. The hybrid vehicle according to claim 1, wherein
   in a case where a change amount of the vehicle driving torque is a first value during execution of the changing process, the control device raises a change rate of the responsiveness achieved by the changing process as compared with a case where the change amount is a second value, wherein the first value is larger than the second value.

5. The hybrid vehicle according to claim 4, wherein
   in a case where an operation amount of the accelerator pedal is equal to or greater than a prescribed value during the mode switching, the control device raises the change rate of the responsiveness achieved by the changing process as compared with a case where the operation amount is smaller than the prescribed value during the mode switching.

6. The hybrid vehicle according to claim 1, further comprising a charging mechanism configured to charge the power storage device using electric power from a power supply external to the vehicle.

7. The hybrid vehicle according to claim 1, wherein the changing process brings the responsiveness from the first value before the mode switching closer to the second value after the mode switching as time progresses at a change rate.

8. An electronic control unit for a hybrid vehicle comprising a power storage device, the electronic control unit configured to:
   switch between a CD (Charge Depleting) mode and a CS (Charge Sustaining) mode, wherein a state of charge of the power storage device is actively consumed in the CD mode, and wherein the state of charge of the power storage device is maintained within a prescribed range in the CS mode; and
   change a responsiveness of a vehicle driving torque to an operation of an accelerator pedal upon switching between the CD mode and the CS mode such that the responsiveness is higher in the CD mode than in the CS mode.

9. The electronic control unit according to claim 8, wherein
   the electronic control unit changes the responsiveness by changing time taken to increase the vehicle driving torque in response to the operation of the accelerator pedal by a prescribed amount.

10. The electronic control unit according to claim 8, wherein when a prescribed time has elapsed since the mode switching was performed, the electronic control unit raises a change rate of the responsiveness as compared with the change rate before the prescribed time elapses.

11. The electronic control unit according to claim 8, wherein
in a case where a change amount of the vehicle driving torque is a first value, the electronic control unit raises a change rate of the responsiveness as compared with a case where the change amount is a second value, wherein the first value is larger than the second value.

12. The electronic control unit according to claim 11, wherein
in a case where an operation amount of the accelerator pedal is equal to or greater than a prescribed value during the mode switching, the electronic control unit raises the change rate of the responsiveness as compared with a case where the operation amount is smaller than the prescribed value during the mode switching.

13. The electronic control unit according to claim 8, further comprising a charging mechanism configured to charge the power storage device using electric power from a power supply external to the vehicle.

14. The electronic control unit according to claim 8, wherein the responsiveness of the vehicle driving torque to the operation of the accelerator pedal is changed at a change rate upon switching between the CD mode and the CS mode.

* * * * *

UNITED STATES PATENT AND TRADEMARK OFFICE
CERTIFICATE OF CORRECTION

| | |
|---|---|
| PATENT NO. | : 9,663,100 B2 |
| APPLICATION NO. | : 15/019022 |
| DATED | : May 30, 2017 |
| INVENTOR(S) | : Keita Sato |

It is certified that error appears in the above-identified patent and that said Letters Patent is hereby corrected as shown below:

In the Specification

Column 8, Line 12, after "and when the" delete "CO", and insert --CS-- therefor.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*